Aug. 30, 1960 C. W. COCHRAN 2,950,513
FASTENING DEVICE
Filed Jan. 17, 1957
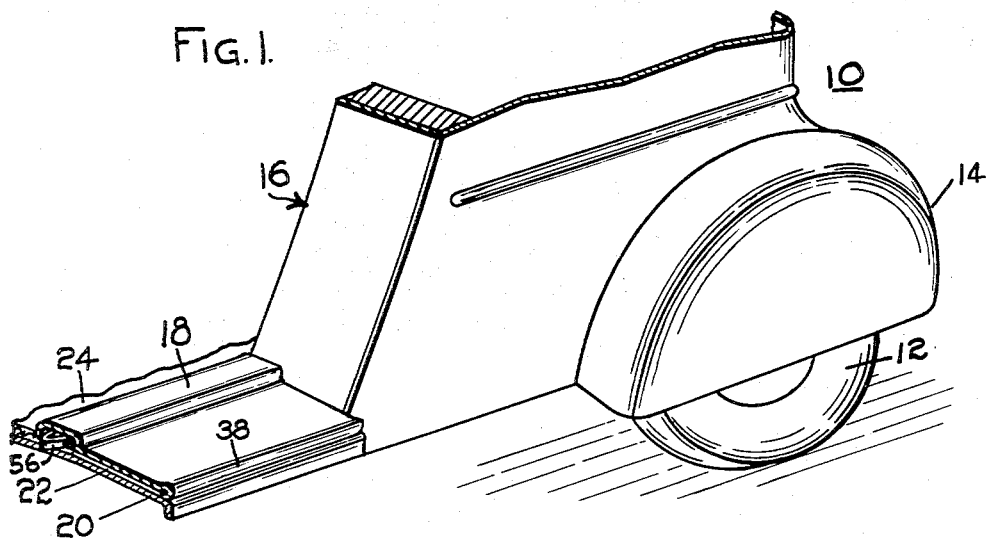
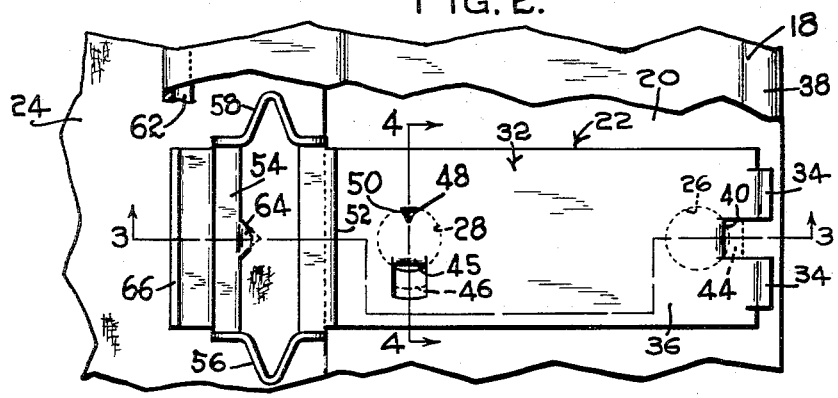
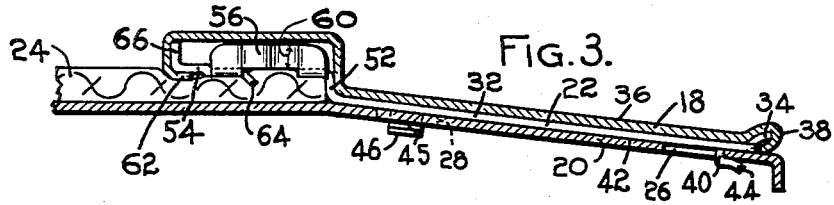
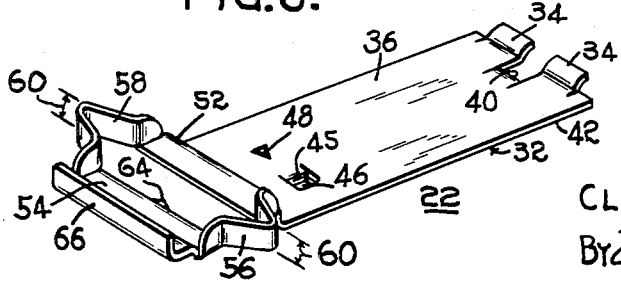
INVENTOR:
CLARENCE W. COCHRAN,
By Walter P. Jones
ATTORNEY.

United States Patent Office 2,950,513
Patented Aug. 30, 1960

2,950,513

FASTENING DEVICE

Clarence W. Cochran, Belmont, Mass., assignor to United-Carr Fastener Corporation, Boston, Mass., a corporation of Delaware Filed Jan. 17, 1957, Ser. No. 634,656

1 Claim. (Cl. 24—73)

This invention relates to fastening devices and more particularly to a device for simultaneously holding both a mat and a scuff plate in place on a support.

Present day high-volume production demands accentuate the need for products which simplify and speed up manufacturing and assembly processes. Such need exists in the field of fastening devices, particularly in the motor vehicle industry where large parts inventories and assembly costs are a constant problem.

Pursuant to the present invention, a fastener having these and other desirable features has been achieved. The present fastener readily lends itself to mass production manufacture. It is formed as a relatively simple, single sheet metal unit and has the advantages of simultaneously performing two fastening functions. They are the holding of both a mat and a molding in place on a support. It is particularly desirable for use in motor vehicles for fixing the floor mats and scuff plates in place on the vehicle floor.

Accordingly, an important object of the present invention is to provide a fastening device which simultaneously performs two functions of holding a mat and scuff plate or molding in place on a support.

Another object is the provision of a fastening device which itself may be easily and rapidly fixed in place on the support.

A further object is the provision of a fastener which readily lends itself to inexpensive mass production manufacture from a single piece of sheet metal as a rapid series of blanking and forming press operations.

A still further object is the provision of a fastener which provides a positive holding action on the mat, molding and support.

These and other features, objects and advantages of the invention will become more apparent from the following description taken in connection with the accompanying drawings of a preferred embodiment of the invention, and wherein:

Fig. 1 is a view in perspective of a portion of the motor vehicle showing the application of the fastener;

Fig. 2 is a plan view of the fastener as applied to the mat and support;

Fig. 3 is a view in section taken on line 3—3 of Fig. 2;

Fig. 4 is a view in section taken on line 4—4 of Fig. 2; and

Fig. 5 is a view in perspective of the fastener.

Referring to the drawings, there is illustrated a portion of a conventional motor vehicle 10, to which the fastener is particularly adapted. Included therein is a rear wheel 12, an associated fender 14, forward of which is a door structure 16 having a molding 18 fixed to a supporting member 20 by the fastener 22 made in accordance with the present invention. Both the fastener 22 and the molding 18 overlap the edge of the floor mat 24 which is thereby held in place on the supporting member 20.

The supporting members 20 of the motor vehicle 10 have openings 26 and 28 spaced on line 3—3 of Fig. 2 for fixing the fastener 22 securely on the floor or support 20. The fastener 22 has a base portion 32 which may be of an elongated rectangular shape. At one end of the base 32 and facing outwardly from the motor vehicle 10, is a projecting extension 34 substantially parallel to and above the top surface 36 of the body a distance sufficient to receive an inwardly projecting gripping edge 38 of the molding 18. At this end, the base portion 32 has a finger 40 extending substantially parallel to and below the bottom surface 42 of the base a distance substantially equal to the thickness of the support 20. The free end 44 of the finger 40 is bent downwardly to provide means for engagement with the opening 26.

The base 32 has a second finger 45 extending downwardly as illustrated along line 4—4 of Fig. 2 with its free end 46 bent laterally away from the mid line of the base portion for insertion in hole 28. A detent 48 is disposed along line 4—4 of Fig. 2 spaced laterally from the downward extending finger 46 a distance such that the sharp ridge portion 50 of the detent 48 engages the inner wall of the hole 28 to prevent lateral movement of the base 32.

The other end of the base 32 has a projecting extension 52 disposed above the supporting member 20 a distance sufficient to receive the floor mat 24. Just forward of the projection 52 and in substantially the same plane is a hold-down plate 54. The hold-down plate 54 is held in place by a pair of angular or U-shaped spring members 56 and 58 having their respective ends integral with the sides of the projecting extension 52 and hold-down plate 54. It will be noted that the spring members 56 and 58 are part of the single piece of sheet metal from which the base 32, projecting extensions 34, 52, and hold-down plate 54 are made. The spring members 56 and 58 have a width 60 in a plane perpendicular to the plane of the base 32 and of a sufficient dimension to provide rigidity for strong hold-down action and resistance to vertical deflection by the hold-down plate 54, but are so constructed as to vary the fastener length to conform to variations in the support width. At the same time, the spring members 56 and 58 provide for deflection of the hold-down plate 54 in the direction of the projection 52 so as to permit an inwardly extending gripping edge 62 (Fig. 3) of the molding or scuff plate 18 to be pushed in place with relative ease.

The hold-down plate 54 has centrally located therein a downwardly extending prong 64 for engaging the mat 24 in a positive gripping action to hold the edge of the mat 24 securely in place on the support 20.

The fastener 22 may be of any suitably resilient material. However, where severe use conditions require maximum ruggedness as in the application described herein, it is preferred that a spring steel with a heat-treated spring temper be used to insure sufficient strength for even the severest conditions.

In the assembly operation of the present fastener, the support 20 is provided with a sufficient number of pairs of holes 26 and 28 determined by the number of fasteners 22 to be used. For each pair of holes 26 and 28, the finger 40 of a fastener 22 is first inserted in the hole 28. The fastener 22 is then pivoted at the finger 40 so as to insert the finger 44 into the hole 26. The finger 44 is then moved sidewise until the detent 48 clicks in place against the side wall of the hole 26. The mat 24 has its edges then pushed beneath the hold-down plate 54 and the projecting extension 52. Thereafter, the scuff plate or molding 18 has its inwardly projecting gripping edge 62 set in place over an upturned edge 66 of the hold-down plate 54 as shown in Fig. 3. By applying pressure at the edge of the molding 18 adjacent to the inwardly projecting edge 62, the spring members 56 and 58 are thereby deflected sufficiently to permit the other inwardly projecting edge 38 to be dropped over the projecting extension 34. The spring action of the spring members 56 and 58 will then cause the hold-down plate 54 to move outwardly to hold the molding 18 firmly in place with a positive holding action.

While the fingers 40 and 44 together with the holes 26 and 28 and detent 48 provide a rapid and inexpensive arrangement for fixing the fastener 22 to the floor or support 20, other conventional means as screws and spot welding may also be used.

This invention is not limited to the particular details shown and described, as equivalents will suggest themselves to those skilled in the art.

I claim:

A fastening device of the class described comprising a body portion divided into two parts, the said two parts being a base and a hold-down plate which are connected by loop like spring members permitting movement of one of the two parts of the body portion toward and away from the other part, molding engaging portions extending from the body portion and being moveable toward and away from each other as one of the said two parts is moved relative to the other part, and relatively rigid attaching means extending directly from the said base for attaching the base to a support, the said base having an integral extension spaced on a plane above the plane of the ramainder of the base and on the same plane as the said hold-down plate to receive a mat and the like below it, and a prong extending from the spaced integral extension for engaging and holding said mat and the like.

References Cited in the file of this patent

UNITED STATES PATENTS

| | | |
|---|---|---|
| 1,905,603 | Place | Apr. 25, 1933 |
| 1,991,259 | Place | Feb. 12, 1935 |
| 2,100,017 | Van Uum | Nov. 23, 1937 |
| 2,476,207 | Brown | July 12, 1947 |
| 2,561,006 | Waara | July 17, 1951 |
| 2,657,443 | Hartman | Nov. 3, 1953 |
| 2,748,840 | Poupitch | June 5, 1956 |
| 2,758,350 | Brown | Aug. 14, 1956 |